UNITED STATES PATENT OFFICE.

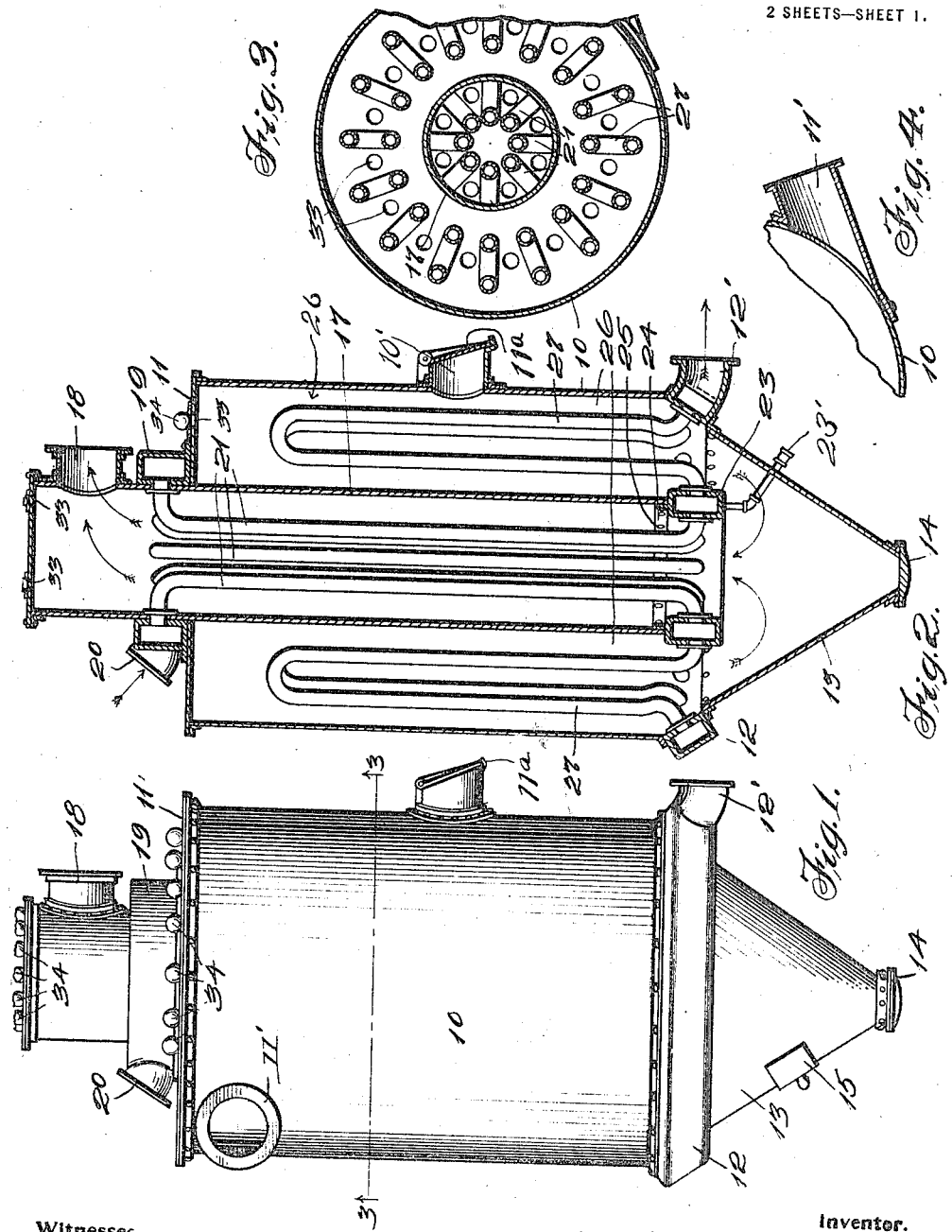

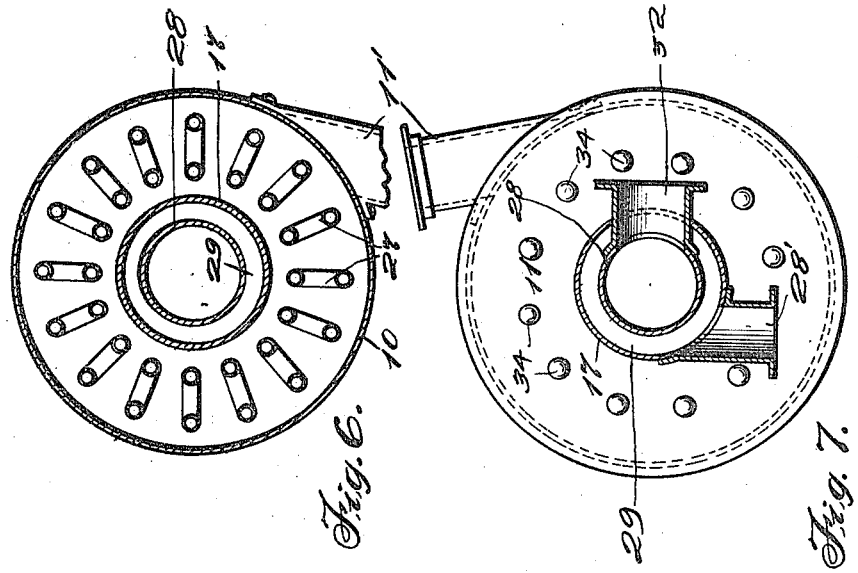
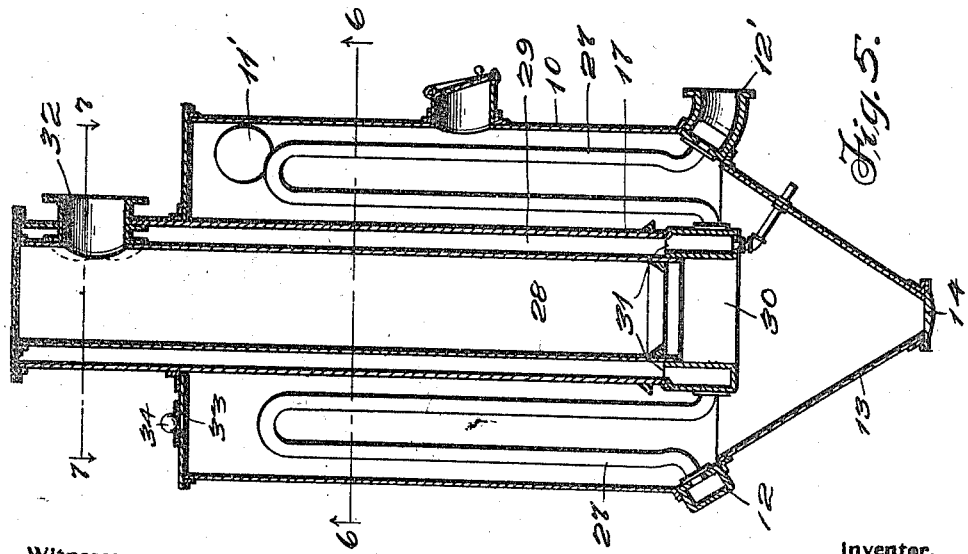

LEWIS A. RILEY, 2D, OF WHITE PLAINS, NEW YORK.

SUPERHEATER.

1,226,379.                     Specification of Letters Patent.        Patented May 15, 1917.

Application filed October 9, 1915. Serial No. 54,973.

*To all whom it may concern:*

Be it known that I, LEWIS A. RILEY, 2D, a citizen of the United States, residing at White Plains, in the county of Westchester and State of New York, have invented certain new and useful Improvements in Superheaters, of which the following is a specification.

My invention relates to improvements in heaters or super-heaters, utilizing products of combustion or heated gases, as a heating medium, and adapted to heat moist air, employed in operating gas producers, while the invention is in no sense restricted to this use, as it may be employed for heating any fluid, by means of a fluid heating medium, derived from practically any source.

An important object of the invention is to provide apparatus of the above mentioned character, which is simple in construction, easy to clean, less subject to internal expansion strains, inexpensive to manufacture, and highly efficient in operation.

Other objects and advantages of the invention will be apparent during the course of the following description.

In the accompanying drawings forming a part of this specification and in which like numerals are employed to designate like parts throughout the same, Figure 1 is a side elevation of apparatus embodying the invention, Fig. 2 is a central vertical longitudinal sectional view through the same, Fig. 3 is a horizontal sectional view taken on line 3—3 of Fig. 1, Fig. 4 is a detailed section through a heating fluid inlet coupling, Fig. 5 is a central vertical longitudinal sectional view through a slightly different form of apparatus embodying the invention, Fig. 6 is a horizontal sectional view taken on line 6—6 of Fig. 5, and, Fig. 7 is a similar view taken on line 7—7 of Fig. 5.

In the drawings, wherein for the purpose of illustration are shown preferred embodiments of my invention, each apparatus comprises an outer preferably more or less vertically arranged preferably cylindrical outer shell or casing 10, the upper end of which is covered by a head 11. This shell 10 has a man-hole 10', covered by a normally closed door 11ª. Discharging into the upper end of the shell 10, is a heating fluid supply device or coupling 11', arranged at a tangent to the periphery of the outer shell 10, to impart rotation to the heating fluid, as it enters the outer shell.

The lower end of the shell 10 has connection with an outer annular header 12, to which is attached a tapered dust collector 13, decreasing in diameter downwardly. The lower end of this dust collector is covered by a cap 14, suitably attached thereto, and the dust collector is preferably provided with an opening in its side, covered by a door 15, adapted to be moved to opened and closed positions. The header 12 has an outlet device or coupling 12', adapted for connection with a suitable pipe.

Extending longitudinally within the outer shell 10 is an inner shell or tube 17, suitably attached to the head 11, and extending upwardly beyond the same for a substantial distance. The foregoing description is common to both forms of the invention.

In Figs. 1 to 3 inclusive, the tube 17 is shown as provided near its upper end with an outlet device or coupling 18, for attachment with a suitable pipe. Surrounding the tube 17 below and adjacent this outlet coupling is an annular header 19, preferably attached to the head 11. This header is provided with an inlet coupling 20, for connection with a pipe for supplying the fluid, to be heated.

Disposed within the tube 17, preferably in a circular group, are inner pipes or conduits 21, the upper ends of which lead into and are connected with the header 19. The lower ends of these inner pipes are connected with and lead into a lower header 23, preferably provided with an upstanding flange 24, bolted or otherwise attached to the lower end of the tube 17, as shown at 25. This header 23 is preferably provided with a liquid drain pipe 23'.

The tube 17 forms with the shell 10 an annular space 26, within which are arranged inverted U-shaped pipes, conduits, or coils 27, preferably disposed in a circular group, as shown. The inner ends of these pipes 27 are connected with and lead into the header 23, while their outer ends are connected with and lead into the header 12, as shown.

In the operation of this form of apparatus, the heating fluid, such as products of combustion, heated gases, or the like, are introduced into the upper end of the shell 10, through the inlet coupling 11', whereby it is given a rotary movement, upon entering the shell. This heating fluid descends in the shell, while continuing more or less its rotary movement, and enters the lower end of the tube 17, and passes upwardly through this tube and finally discharges through the coupling 18. The fluid to be heated, which may be moist air or the like, is introduced into the header 19, through the coupling 20, and passes downwardly through the inner pipes 21. This fluid to be heated descends in these pipes and enters the inner lower header 23, from which it passes through the outer pipes 27. This fluid discharges into the outer lower header 12, and finally passes through the outlet coupling 12'.

In the apparatus shown in Figs. 4 to 7 inclusive, a second tube 28 is arranged concentrically within the tube 17, in spaced relation, forming therewith a conduit or passage 29, the upper end of which is closed, as shown. As clearly shown in Fig. 7, a coupling 28' is connected with the tube 17, for supplying the fluid to be heated into the space or conduit 29. The lower ends of the tubes 17 and 28 are attached to an annular header 30 and the space between said tubes is in communication through the annular opening 31 with the interior of the header 30, as shown.

The same outer pipes 27 are employed, and they lead into the header 12, and into the header 30, as shown.

Leading into the upper end of the inner tube 28, is a coupling 32, having no communication with the space 29, as shown.

In the operation of the second form of apparatus, the heating fluid is introduced through the inlet coupling 11', and is caused to rotate in the upper end of the shell 10, and descends therein while continuing this rotation. The heating fluid passes upwardly through the tube 28 and discharges through the outlet coupling 32. The fluid to be heated is introduced into the upper end of the annular space or conduit 29, through the conduit or coupling 28', and descends therein to pass into the header 30. From this header this fluid passes through the pipes 27 and discharges into the outer header 12, and is discharged through the coupling 12'.

In both forms of apparatus suitable poke holes 33 are provided in both the head 11 and the cover or head plate of shell or tube 17 whereby the surfaces of pipes and tubes exposed to the action of the heating fluid may be readily cleaned from time to time by suitable pokebars without interfering with the continuous operation of the apparatus. These poke holes are normally closed by a ball 34 or other suitable means. Owing to the design and arrangement of this apparatus as shown the unequal expansion of the various component parts is to a great extent eliminated, thus preventing internal strains and leakages.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

Having thus described the invention, I claim:—

1. In apparatus of the character described, an outer shell provided near one end with heating fluid inlet means; a tube extending longitudinally within the outer shell and having one end open and arranged near the opposite end of the outer shell, said tube extending beyond the first named end of the outer shell for a substantial distance and provided with heating fluid outlet means discharging to the atmosphere exteriorly of the outer shell; and fluid heating apparatus arranged within the outer shell between it and the tube.

2. In apparatus of the character described; an outer shell having heating fluid inlet means; a tube extending longitudinally within the outer shell and provided with heating fluid outlet means; a header attached to one end of the tube; a supply conduit for fluid to be heated connected with the header; and pipes connected with the header and arranged within the space between the tube and the outer shell.

3. In apparatus of the character described; an outer shell having heating fluid inlet means arranged near one end thereof; a tube extending longitudinally within the outer shell and projecting outwardly beyond the end of the outer shell having at one end heating fluid inlet means and provided near the opposite end with heating fluid outlet means; a header attached to the inner end of the tube; a supply conduit for fluid to be heated connected with the header; and conduits connected with the header and arranged within the space between the tube and the outer shell.

4. In apparatus of the character described; an outer shell having fluid inlet means; a tube extending longitudinally within the outer shell and having fluid outlet means; a header attached to the tube; a supply conduit for fluid to be heated connected with the header; an outer header attached to the outer shell; and pipes connecting the first and second named headers.

5. In apparatus of the character described; an outer shell; an inner tube and header arranged therein; a supply conduit connected with the header; an outer header attached to the outer shell; and pipes connecting the first and second named headers.

6. In apparatus of the character described; an approximately vertical outer shell provided near its upper end with a heating fluid inlet device adapted to impart rotation to the heating fluid upon entering the shell; an approximately vertical tube extending longitudinally within the shell and having its upper end projecting above the top of the outer shell and there provided with outlet means; heating conduits extending longitudinally within the outer shell with portions thereof disposed interiorly and exteriorly of the tube; inlet means for the heating conduits; and outlet means for the heating conduits.

7. In apparatus of the character described; an approximately vertical outer shell provided near its upper end with heating fluid inlet means; a tube extending longitudinally within the outer shell and projecting upwardly beyond the top thereof and having heating fluid outlet means arranged near its upper end; a header attached to the upper end of the tube; a lower inner header attached to the lower end of the tube; conduits connecting the upper and lower headers; an outlet header attached to the outer shell; and conduits connecting the inner lower header and the outer header.

8. In apparatus of the character described; an approximately vertical outer shell provided near its upper end with a heating fluid inlet means; a dust collector connected with the lower end of the shell; an inner shell extending longitudinally within the outer shell in spaced relation thereto and having its lower end spaced from the dust collector and its upper end provided with heating fluid outlet means; and means for receiving the fluid to be heated and means for distributing same arranged between the inner and the outer shells.

9. In apparatus of the character described; an outer shell; a dust collector connected with one end thereof; means for supplying a heating fluid to the outer shell; a second shell extending longitudinally within the outer shell in spaced relation thereto and having heating fluid outlet means; and means for receiving and distributing the fluid to be heated arranged within the outer shell.

In testimony whereof I affix my signature in presence of two witnesses.

LEWIS A. RILEY, 2D.

Witnesses:
 WM. J. COTTERELL,
 CHARLES A. HAUGLEY.